United States Patent [19]

Ibe

[11] Patent Number: 5,267,140
[45] Date of Patent: Nov. 30, 1993

[54] METHOD OF APPARATUS FOR CORRECTING DYNAMIC BALANCE OF ROTATABLE MEMBER

[75] Inventor: Horomitu Ibe, Kosai, Japan
[73] Assignee: Asmo Co. Ltd.
[21] Appl. No.: 789,310
[22] Filed: Nov. 8, 1991

[30] Foreign Application Priority Data

Dec. 27, 1990 [JP] Japan .................... 2-408323

[51] Int. Cl.⁵ .............. G06F 15/20; G01M 1/16; G05B 13/02
[52] U.S. Cl. ................................ 364/148; 73/468; 118/669; 364/463
[58] Field of Search ............... 364/148, 152, 167.01, 364/463, 508, 571.01; 73/462, 468, 469, 660; 118/669, 670, 697, 708; 74/573 R, 574

[56] References Cited

U.S. PATENT DOCUMENTS

| | | | |
|---|---|---|---|
| 3,939,020 | 2/1976 | Caramanian et al. | 156/64 |
| 4,773,019 | 9/1988 | Martin et al. | 364/463 |
| 4,958,290 | 9/1990 | Kendall et al. | 364/463 |
| 4,977,510 | 12/1990 | Winzenz et al. | 364/463 |
| 5,099,430 | 3/1992 | Hirsch | 364/463 |
| 5,141,768 | 8/1992 | Ibe et al. | 427/8 X |
| 5,201,248 | 4/1993 | Ibe et al. | 74/573 R |

FOREIGN PATENT DOCUMENTS

| | | |
|---|---|---|
| 2705217 | 9/1977 | Fed. Rep. of Germany . |
| 3313568 | 10/1983 | Fed. Rep. of Germany . |
| 3503724 | 8/1986 | Fed. Rep. of Germany . |
| 3713525 | 10/1987 | Fed. Rep. of Germany . |
| 62-203535 | 9/1987 | Japan . |
| 63-311 | 1/1988 | Japan . |
| 63-39655 | 3/1988 | Japan . |
| 63-92639 | 4/1988 | Japan . |

*Primary Examiner*—Joseph Ruggiero
*Attorney, Agent, or Firm*—Venable, Baetjer, Howard & Civiletti

[57] ABSTRACT

A dynamic balance correcting apparatus comprising a learning unit and a balance confirmation unit for remeasuring the state of balance of a rotatable member which has been subjected to correction of its dynamic balance and for determining whether or not the rotatable member has been brought into a given balanced state. The results of the determinations by the balance confirmation unit are sequentially input to the learning unit. Then, the learning unit statistically calculates the ratio of success in the corrected state of dynamic balance of the rotatable member and automatically updates operational conditions of the apparatus in such a manner as to enable the ratio of success to reach the maximum value. It is therefore possible to correct dynamic unbalance of rotatable members without the need of experience and skill on the part of an operator, even when the ratio of success is reduced owing to time-dependent variations. In addition, both the correction accuracy and the operating efficiency of the apparatus can be improved.

21 Claims, 4 Drawing Sheets

METHOD OF APPARATUS FOR CORRECTING DYNAMIC BALANCE OF ROTATABLE MEMBER

BACKGROUND OF THE INVENTION

1. Field of the Invention

The present invention relates to a method of and an apparatus for correcting unbalance of a rotatable member such as a rotor for an electric motor by adhering a correction material to the rotatable member or removing an unbalanced portion of the rotatable member.

2. Description of the Related Art:

There is known a dynamic balance correcting apparatus for correcting the unbalance of a rotatable member (such as a rotor for an electric motor or the like) by adhering a correction material (putty is usually used) such as known compositions disclosed in, for example, Japanese Patent Application Laid-Open No. 63-92639 to the rotatable member, or by removing an unbalanced portion of the rotatable member after a dynamic unbalanced state of the rotatable member is measured.

In each of the dynamic balance correcting apparatuses (disclosed in, for example, Japanese Patent Application Laid-Open No. 62-203535 and Japanese Utility Model Application Laid-Open No. 63-39655) for correcting the unbalance of a rotatable member by adhering a correction material to the rotatable member, an unbalanced state of the rotatable member (a so-called work) is measured by a measuring unit. Then, the position on the rotatable member at which correction is required and the quantity or mass of the correction material required to correct the unbalance are determined based on the result of measurement by the measuring unit. Further, based on the result of the determination, the rotatable member is positioned so that the position at which correction is required is oriented upward, and the correction material in a quantity corresponding to the amount of unbalance of the rotatable member to be corrected is delivered to the rotatable member from a delivery unit such as a nozzle, etc. so as to be adhered to the position on the rotatable member requiring correction.

In this type of conventional dynamic balance correcting apparatus, a positioning unit for positioning the rotatable member after completion of the measurement of the unbalanced state thereof and a delivery unit for delivering a correction material of a predetermined amount particularly made it necessary to carry out a so-called master alignment at regular intervals in order to adequately deal with time-dependent variations in the apparatus or changes in the work environment. In other words, the correction of each unit in the apparatus was carried out using a master work in such a manner that correction material in an accurate amount was adhered to the precise position on the rotatable member to be corrected.

However, master alignment requires a long period of time because extremely fine adjustment is required. Thus, the apparatus is deactivated over a long period of time during the interval in which the master alignment is carried out, and the operating efficiency of the equipment is greatly reduced.

In particular, even though master alignment is accurately carried out, the conventional dynamic balance correcting apparatus cannot sufficiently correct a fine error produced between each work actually fed to the apparatus for the correction of unbalance and the master work, a variation produced between each work, etc. Thus, an operator having adequate experience and skillfulness is necessary to the operation of the apparatus, in order to satisfactorily carry out the correction of the unbalance of each work.

SUMMARY OF THE INVENTION

With the foregoing problems in view, it is an object of the present invention to provide a method of and an apparatus for correcting the dynamic balance of a rotatable member, by which dynamic unbalance of the rotatable member can be corrected without the need for particular experience and skill on the part of an operator and the correction accuracy and the operating efficiency of the apparatus can be improved.

According to one aspect of the present invention, there is provided a first method of correcting the dynamic balance of a rotatable member, the method comprising the following steps:

a first step of measuring the position of the rotatable member dynamically unbalanced and the quantity of the rotatable member dynamically unbalanced;

a second step of deciding the position of the rotatable member to be corrected and the quantity of the rotatable member to be corrected, based on the result of measurement of the unbalanced position and the result of measurement of the unbalanced quantity, respectively;

a third step of processing a portion corresponding to the correction position of the rotatable member by a quantity corresponding to the correction quantity, thereby correcting the dynamic balance of the rotatable member;

a fourth step of determining, after the dynamic balance of the rotatable member is corrected, whether or not the dynamic balance of the rotatable member has been brought into a predetermined corrected state; and a fifth step of executing learning control for updating at least one of the correction position and the correction quantity, based on the results of the fourth step in such a manner that the yield of a plurality of rotatable members exceeds a predetermined value.

According to the first method of the present invention, the dynamic balance of the rotatable member is corrected in the first to third steps. It is determined in the fourth step whether or not the dynamic balance of the rotatable member has been brought into a predetermined corrected state. The learning control for updating at least one of the correction position and the correction quantity is carried out based on the result of the above determination in the fifth step above in such a way that the yield of a plurality of rotatable members exceeds the predetermined value. In order to cause the yield to exceed the predetermined value, the ratio of success in the corrected state of dynamic balance for the plurality of rotatable members is calculated from the results of the determination as to whether or not the dynamic balance of each of the rotatable members has been brought into the proper corrected state, thereby enabling the ratio of success thus calculated to exceed a predetermined value in the fifth step. Alternatively, amount of residual unbalance for each of the plurality of rotatable members subjected to the correction of dynamic balance are measured in the fourth step, and either the accumulated value or the average value of these amounts of residual unbalance thus measured is calculated in the fifth step, thereby allowing either the accumulated value or the average value thus calculated to be less than or equal to a predetermined value. It is therefore possible to automatically correct the unbalance of each rotatable member without the need for particular experience and skill on the part of the operator, and to improve the correction accuracy and the operating efficiency of the apparatus.

According to another aspect of the present invention, there is provided a second method of correcting the dynamic balance of a rotatable member, the method comprising the following steps A and B:

the step A including the following repeatedly-executed subdivided steps:

a first step of measuring the position of the rotatable member dynamically unbalanced and the quantity of the rotatable member dynamically unbalanced;

a second step of deciding the position of the rotatable member to be corrected and the quantity of the rotatable member to be corrected, based on the result of measurement of the unbalanced position and the result of measurement of the unbalanced quantity, respectively;

a third step of processing a portion corresponding to the correction position of the rotatable member by a quantity corresponding to the correction quantity, thereby correcting the dynamic balance of the rotatable member; and a fourth step of determining, after completion of the correction of the dynamic balance of the rotatable member, whether or not the dynamic balance of the rotatable member has been brought into a predetermined corrected state; and the step B including the following step:

executing learning control for sequentially repeating the first to fourth steps while at least one of the correction position and the correction quantity is being updated when yield of a plurality of rotatable members is reduced, thereby enabling the yield of the plurality of rotatable members to exceed a predetermined value.

According to the second method of the present invention, the dynamic balance of the rotatable member is corrected in the first to third steps. It is determined in the fourth step whether or not the dynamic balance of the rotatable member has been brought into a predetermined corrected state. In the Step B, the learning control is carried out in such a manner that the yield of the plurality of rotatable members exceeds the predetermined value at all times only when it is judged that the yield of the plurality of rotatable members is reduced, e.g., only when the present yield is reduced by a value not less than a predetermined value as compared with the previous yield or only when the yield is reduced to a value not more than a predetermined value. Thus, the number of times in which the learning control is carried out can be reduced because the learning control is performed only as needed.

According to a further aspect of the present invention, there is provided a dynamic balance correcting apparatus for correcting dynamic balance of a rotatable member, the apparatus comprising:

measuring means for measuring the position of the rotatable member dynamically unbalanced and the quantity of the rotatable member dynamically unbalanced;

deciding means for deciding the position of the rotatable member to be corrected and the quantity of the rotatable member to be corrected, based on the result of measurement of the unbalanced position and the result of measurement of the unbalanced quantity, respectively;

correcting means for processing a portion corresponding to the correction position of the rotatable member by a quantity corresponding to the correction quantity, thereby correcting the dynamic balance of the rotatable member;

determining means for determining, after the dynamic balance of the rotatable member is corrected, whether or not the dynamic balance of the rotatable member has been brought into a predetermined corrected state; and learning means for executing learning control for updating at least one of the correction position and the correction quantity when yield of a plurality of rotatable members is reduced, thereby enabling the yield of the rotatable members to exceed a predetermined value.

Since the dynamic balance correcting apparatus according to the present invention is provided with the learning means, the learning control can be carried out when the yield of the plurality of rotatable members is reduced, thereby enabling the yield of the plurality of rotatable members to exceed the predetermined value. It is therefore possible to automatically correct the unbalance of each rotatable member without the need for particular experience and skill on the part of the operator, and to improve the correction accuracy and the operating efficiency of the apparatus.

The above and other objects, features and advantages of the present invention will become apparent from the following description and the appended claims, taken in conjunction with the accompanying drawings in which a preferred embodiment of the present invention is shown by way of illustrative example.

DETAILED DESCRIPTION OF THE PREFERRED EMBODIMENTS

Figure 1:
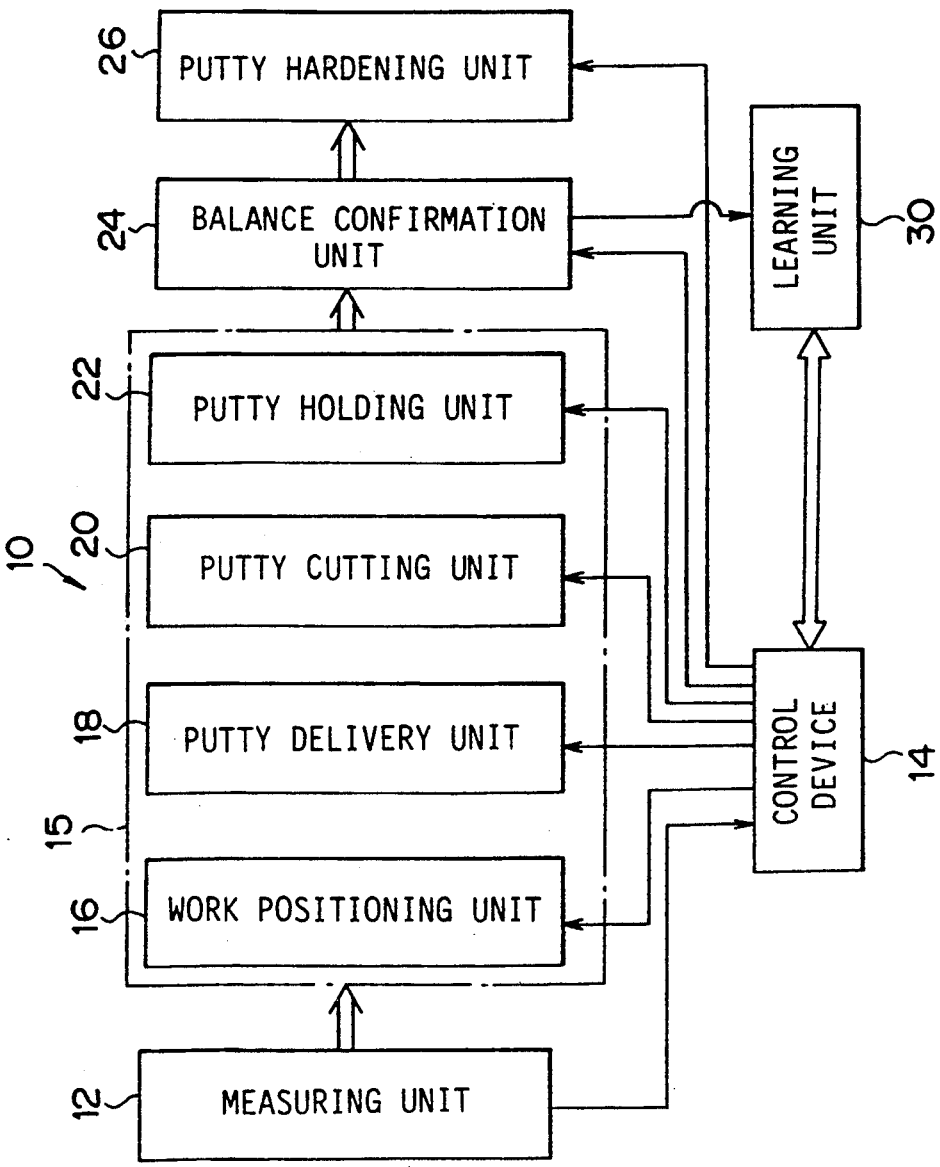
FIG. 1 is a block diagram schematically showing the overall structure of a dynamic balance correcting apparatus for correcting the dynamic balance of a rotatable member, according to one embodiment of the present invention.
Figure 2:
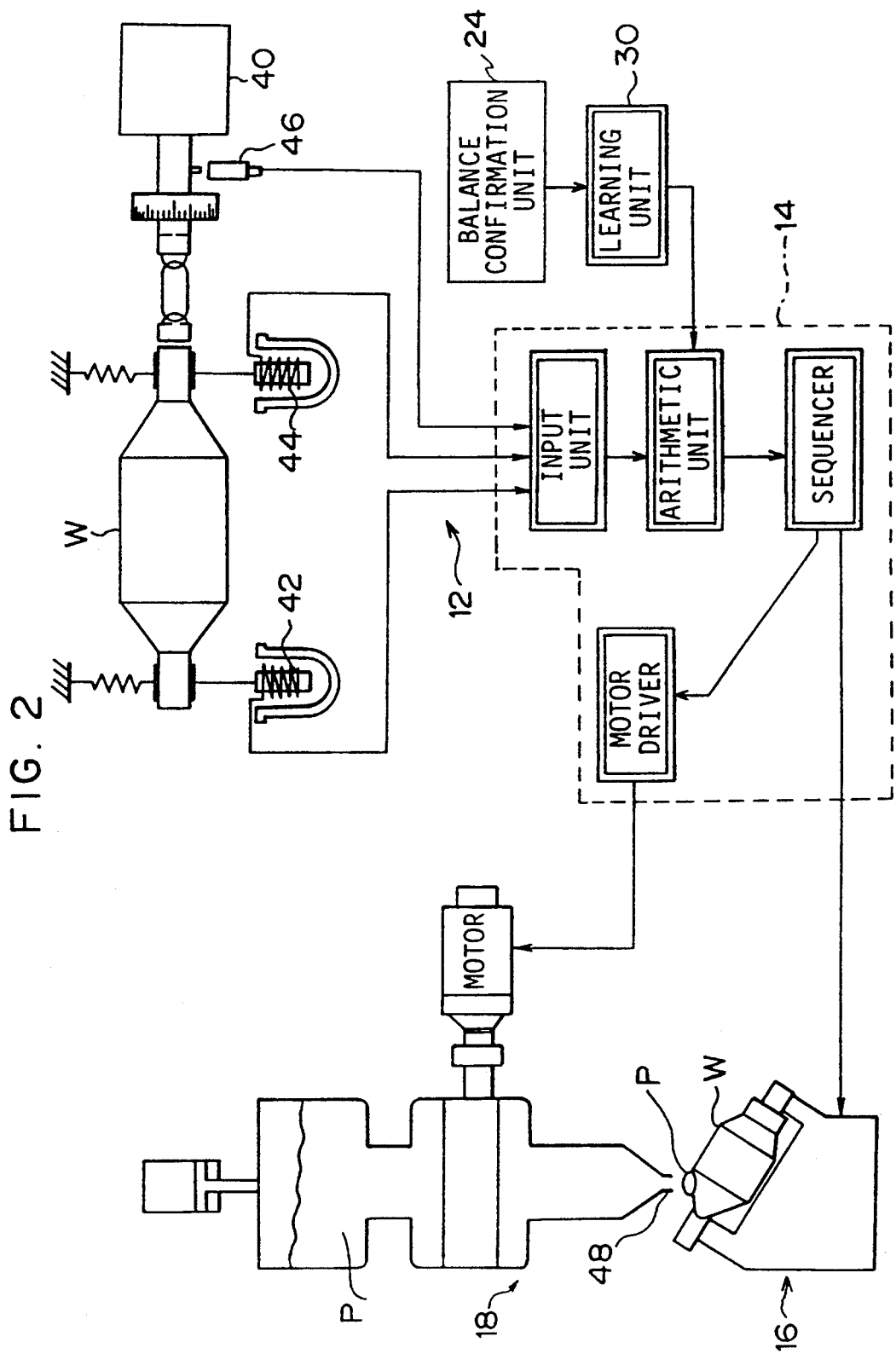
FIG. 2 is a diagram schematically showing a major part of the dynamic balance correcting apparatus.

FIG. 1 is a block diagram showing the overall structure of a dynamic balance correcting apparatus 10 according to one embodiment of the present invention. FIG. 2 is a schematic diagram showing a major part of the dynamic balance correcting apparatus.

The dynamic balance correcting apparatus 10 has a measuring unit 12 for measuring a dynamically unbalanced state of a rotatable member (work W) such as a rotor used for an electric motor, etc., i.e., the location at which the rotatable member is dynamically unbalanced and the amount or mass of the dynamically-unbalanced portion of the rotatable member. The measuring unit 12 is provided with a drive unit 40 used to rotate a work W, and a pair of vibration detectors 42, 44 used to support a work W while it is being rotated and to detect the level of vibration which occurs at the supporting portion. There is also disposed, near a rotatable shaft of the drive unit 40, a photosensor 46 for detecting the angular position of rotation of the rotatable shaft, i.e., the work W. The results of measurement by the measuring unit 12 are supplied to a control device 14.

The control device 14 comprises an input unit supplied with the results of the measurement by the measuring unit 12, an arithmetic unit, a sequencer and a motor driver. The arithmetic unit is composed of a microcomputer having a backup RAM for storing therein the value updated by learning, etc., a CPU and a ROM for storing therein programs used to activate the dynamic balance correcting apparatus 10. The arithmetic unit determines the position at which putty P as a correction material is to be adhered to the work W and the amount of the putty P to be adhered thereto, based on the result of the measurement of both the location of unbalance and the amount of unbalance by the measuring unit 12, and operation parameters learned by a learning unit 30 (or initial operation parameters).

A work positioning unit 16 of a correcting device 15 is electrically connected to the control device 14. The control device 14 automatically sets the work W when the position on the work at which the putty P is to be adhered, which is determined by the arithmetic unit, has been positioned so as to be properly oriented upward, i.e., has been positioned directly below a nozzle 48. Also connected to the control device 14 are a putty delivery unit 18 for delivering the putty P from the nozzle 48 to the position where the work W set by the work positioning unit 16 is to be corrected (i.e., the position where the putty P is adhered to the work W); a putty cutting unit 20 for cutting the putty P after a predetermined amount thereof has been discharged from the nozzle 48, so as to separate the discharged putty from the putty delivery unit 18, and for adhering the cut-off putty P to the work W; and a putty holding unit 22 for holding the putty adhered to the work W and fixing the same. The control device 14 controls the respective units referred to above so as to automatically adhere the putty P to the work W in accordance with the extent of the unbalanced state of the work W.

Then, the work W with the putty P adhered thereto is delivered to a balance confirmation unit 24. The balance confirmation unit 24 is basically identical in structure to the measuring unit 12. The balance confirmation unit 24 measures the state of dynamic-balance of the work W after the putty P has been adhered thereto, i.e., measures the mass or amount of unbalance remaining in the corrected work W, i.e., a residual unbalanced mass of the work W so as to determine whether or not the work W has been brought into a predetermined state of dynamic-balance.

The learning unit 30 is electrically connected to the balance confirmation unit 24, and connected to an arithmetic unit of the control device 14. The learning unit 30 statistically collects the results of the determination carried out by the balance confirmation unit 24, in accordance with a learning program to be described later, so as to calculate the ratio of success in achieving an adequately balanced state of the work W. In addition, in order to set the ratio of success at the desired maximum value, the learning unit 30 calculates operation parameters $\alpha$, $\beta$, which are then used to change or update the position where the work W has been set by the work positioning unit 16 and the delivery rate of the putty from the putty delivery unit 18. The so-processed operation parameters $\alpha$, $\beta$ are stored in the backup RAM of the control device 14 as data.

The work W whose state of balance has been confirmed by the balance confirmation unit 24 is delivered to a putty hardening unit 26, where the putty P adhered to the work W is forcibly hardened and fixed.

A description will now be made of the principle behind the correction of the dynamic balance of the work W, which is carried out by the dynamic balance correcting apparatus according to the present embodiment.

Figure 4:
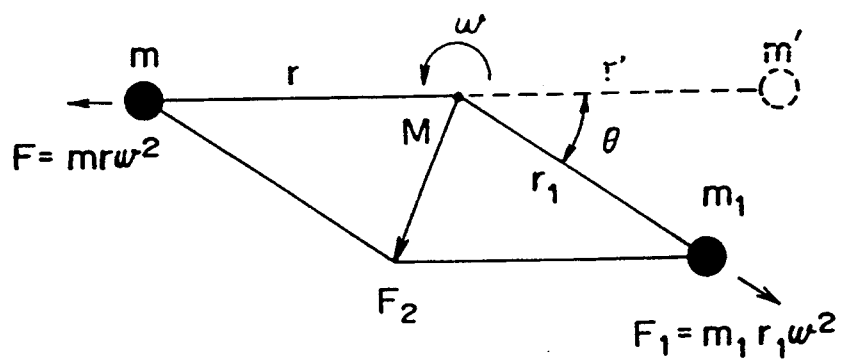
FIG. 4 is a model diagram for correcting the unbalance of the rotatable member.

The dynamic balance correcting apparatus 10 referred to above is a so-called positive correction type apparatus wherein the putty P is adhered to the work W which is in a dynamically-unbalanced state so as to correct the dynamic balance of the work W. FIG. 4 is a model diagram for describing the correction of the unbalance of the work W. Symbols used in FIG. 4 are as follows:

m: amount (mass) of unbalance of work W rotatable member M)

r: distance between the center of rotatable member and the location at which the mass m exists $\omega$: angular rotational velocity of work W $m_1$: mass of putty P adhered to work W (rotatable member M)

$r_1$: distance between the center of rotatable member and the position at which the mass $m_1$ is adhered $\theta$: angular position of $m_1$ $F_2$: residual unbalancing force Let's now assume that an amount of unbalance corresponding to the mass m exists at a location spaced by a radius r from the axial center of the work W (rotatable member M) as shown in FIG. 4. If the work W is rotated at the angular velocity $\omega$ in this case, then the force of $mr\omega^2$ is exerted on the work W, thereby causing vibration. Thus, the putty P of mass m' equivalent to the mass m may be adhered to the work W at a position (antipodal to the position of the mass m) at a distance of radium r' (r=r'), indicated by the broken line in FIG. 4, from the work W.

However, it frequently happens in practice that the putty P of mass $m_1$ different from an ideal correction quantity (mass m' indicated by the broken circle) to be corrected be adhered to the work W in a position moved clockwise through the angle $\theta$ and spaced by the radius $r_1$ from the ideal correction position (r' indicated by the broken line), owing to errors or the like produced by any of the respective units in the dynamic balance correcting apparatus. In this case, an unbalancing resultant force shown by $F_2$ remains.

Figure 5:
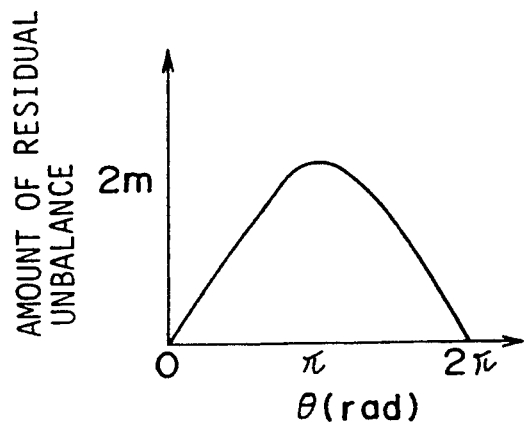
FIG. 5 is a diagram for describing the relationship between the mass of residual unbalance of each rotatable member and the angle for setting putty.
Figure 6:
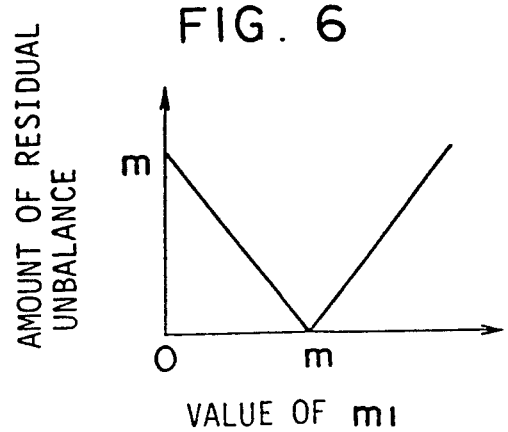
FIG. 6 is a diagram for describing the relationship between the mass of residual unbalance of each rotatable member and the amount of putty adhered thereto.

The residual unbalancing force $F_2$ increases or decreases with a change in the angle $\theta$ as shown in FIG. 5. When the angle $\theta$ reaches $\pi$, the force $F_2$ becomes a maximum value, whereas when the angle $\theta$ reaches either 0 or $2\pi$, it becomes a minimum value. In addition, the force $F_2$ increases or decreases with the value of the mass $m_1$ as illustrated in FIG. 6. When the mass $m_1$ becomes equivalent to the mass m, the force $F_2$ reaches a minimum value. It is thus understood that the angle $\theta$ must be set equal to 0 (i.e., $\theta=0$) and the mass $m_1$ must be set equivalent to the mass m (i.e., $m_1=m$) in order to avoid the creation of the force $F_2$.

Figure 3:
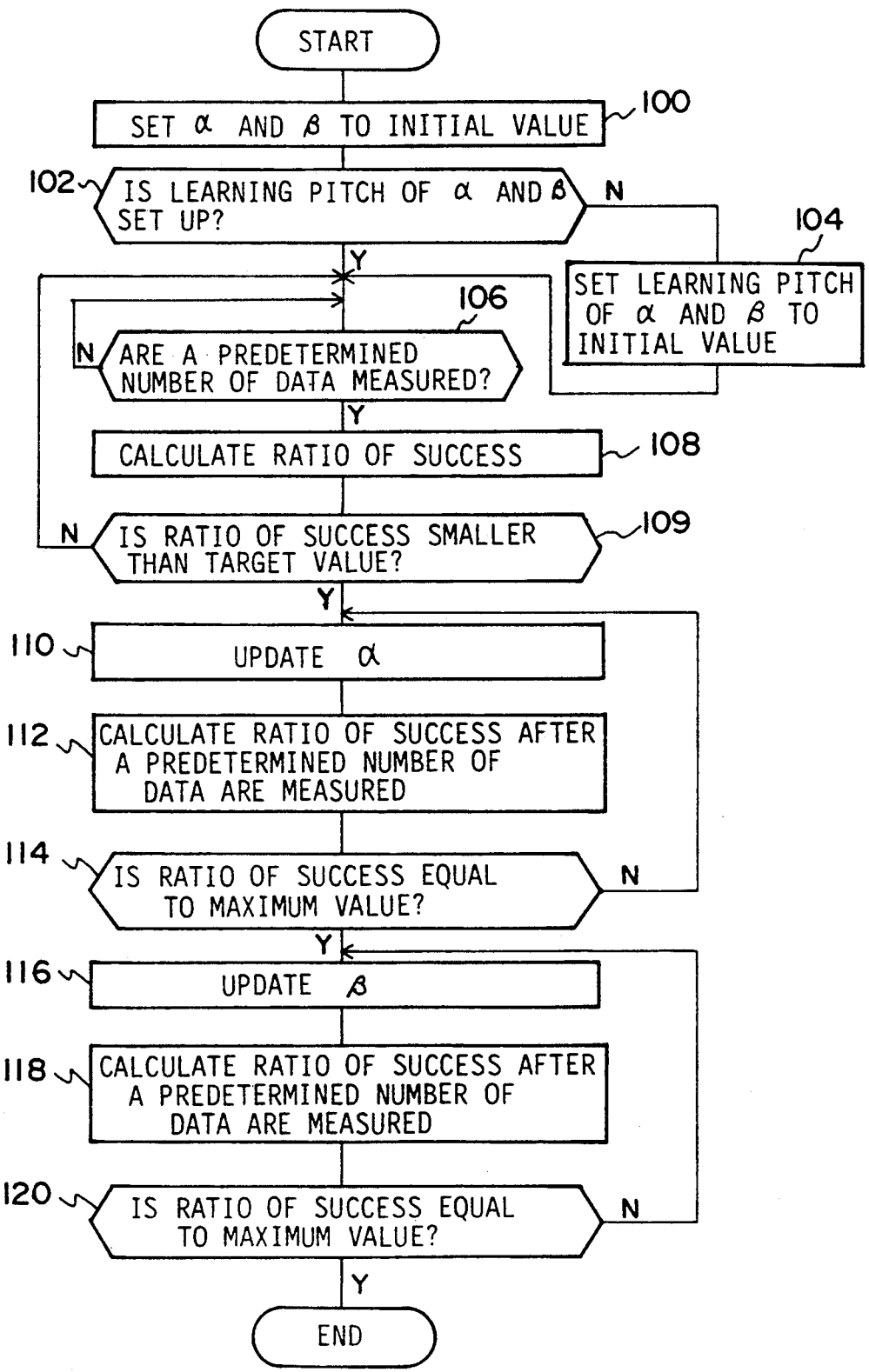
FIG. 3 is a flowchart for describing learning routines executed in a learning unit of the dynamic balance correcting apparatus.

The operation of the present embodiment will now be described with reference to a flowchart shown in FIG. 3 used to describe learning routines executed by the learning unit.

When the dynamic balance correcting apparatus 10 is activated, the operation parameter $\alpha$ for determining the engagement position of a work W in the work positioning unit 16 and the operation parameter $\beta$ for determining the delivery rate of the putty from the putty delivery unit 18 are respectively set to initial values in accordance with an initial operation state in Step 100, whereby initial operation conditions of the work positioning unit 16 and of the putty delivery unit 18 are respectively established. It is then determined in Step 102 whether or not the learning pitch (arithmetic condition for changing or updating the operation parameters $\alpha$ and $\beta$) of the learning unit 30 is set up. If it is determined to be negative in Step 102, then the learning pitches of $\alpha$ and $\beta$ are respectively set to initial values in Step 104. Incidentally, the operation parameters $\alpha$ and $\beta$ are read from the backup RAM after the learning of the learning unit 30 is completed. Under this condition, the respective units of the dynamic balance correcting apparatus 10 are activated to start the correction of the unbalance of the work W.

More specifically, after the state of dynamic-unbalance of the work W is measured by the measuring unit 12, the control device 14 is activated to calculate the position at which the work W is to be corrected and the amount of the putty P to be adhered to the work W, based on the results of the measurement by the measuring unit 12 and the operation parameters $\alpha$ and $\beta$ stored in the backup RAM. Then, the work W is positioned by the work positioning unit 16 and the putty P is automatically delivered to the work W from the putty delivery unit 18. After the putty P is delivered to the work W in a predetermined amount, the putty P is cut by the putty cutting unit 20. Thereafter, the putty holding unit 22 is activated to hold and fix the putty P adhered to the work W.

Then, the balance confirmation unit 24 measures the amount of residual unbalance of the work W and makes a decision as to whether or not the work W has been brought into a predetermined state of dynamic-balance. The result of the decision by the balance confirmation unit 24 is temporarily stored in the learning unit 30 as data. The balance confirmation unit 24 compares the amount of residual unbalance of the work W with a predetermined value so as to make a decision as to whether or not the amount of residual unbalance is not more than the predetermined value. If the answer is determined to be yes, then it is judged that the work W has been brought into the predetermined state of dynamic-balance. Alternatively, the learning unit 30 may make such a decision.

Then, the work W is delivered to the putty hardening unit 26, where the putty P adhered to the work W is forcibly hardened and fixed thereto.

Then, the process for correcting the unbalance of the work W proceeds; it is determined in Step 106 whether or not the correction of the unbalance of a predetermined number of works W is finished and a predetermined number of data indicative of whether or not the work W has been brought into the predetermined state of dynamic-balance are input. If the number of data reaches a predetermined number, then the ratio of success in the corrected state is calculated in Step 108. It is then determined in Step 109 whether or not the ratio of success thus calculated is smaller than a target value. If the answer is determined to be yes in Step 109, the routine procedure proceeds to Step 110. If the answer is determined to be no in Step 109, the routine procedure returns to Step 106, where the correction of the unbalance of the work W is continued without changing any of the operation parameters. When the unbalance of each of a predetermined number of works W is corrected and a predetermined number of data indicative of whether or not the work W has been brought into the predetermined state of dynamic-balance are input, the ratio of success in the corrected state is calculated again in Step 108. In order to deal with a rapid change in the ratio of success in the corrected state at this time, a group of a predetermined number of data indicative of whether or not the work W has been brought into the predetermined state of dynamic-balance, the data being used to calculate the present ratio of success in the corrected state may be selected so as to overlap with the previous group of data, thereby calculating the ratio of success in the corrected state.

The ratio of success gradually decreases owing to undesired errors produced by changes in temperature, variations with time, etc. Thus, if it is determined in Step 109 that the ratio of success is lower than the target value, then the routine procedure proceeds to Step 110, where the learning process for correcting the operation parameters is carried out.

In Step 110, the operation parameter $\alpha$ is then updated in accordance with the learning pitch. When the operation parameter $\alpha$ is updated, the operation parameter $\alpha$ stored in the backup RAM is replaced by the value thus updated. Thus, the control device 14 automatically changes the position of the work set by the work positioning unit 16 on the basis of the value referred to above. When the operation parameter $\alpha$ assumes a large value, for example, the work W is positioned at a location where the angle $\theta$ is large, whereas when the operation parameter $\alpha$ assumes a small value, it is positioned at the location where the angle $\theta$ is small. When the number of corrections with respect to the unbalance of the work W reaches a predetermined number and a predetermined number of data indicative of whether or not the work W has been brought into a predetermined state of dynamic-balance are input, the ratio of success in the corrected state is calculated again in Step 112 so as to be compared with the previous ratio of success in the corrected state. The operation parameter $\alpha$ is updated and the calculation of the ratio of success is sequentially repeated until it is judged in Step 114 that the ratio of success reaches the maximum value.

If the operation parameter $\alpha$ is set to the optimum value (if it is determined that the ratio of success is at its maximum in Step 114), then the routine procedure proceeds to Step 116, where the operation parameter $\beta$ is updated in accordance with the learning pitch. When the operation parameter $\beta$ is updated, the operation parameter $\beta$ stored in the backup RAM is replaced by the value thus updated. Thus, the control device 14 automatically modifies the delivery rate of the putty P from the putty delivery unit 18, based on the value referred to above. When the operation parameter $\beta$ assumes a large value, for example, the putty P is delivered from the putty delivery unit 18 in such a manner that the mass $m_1$ becomes large. On the other hand, when it assumes a small value, the putty P is discharged from the putty delivery unit 18 in such a way that the mass $m_1$ becomes small. When the number of corrections with respect to the unbalance of the work W reaches a predetermined number and a predetermined number of data indicative of whether or not the work W has been brought into a given state of dynamic-balance are input, the ratio of success in the corrected state is calculated again in Step 118 so as to be compared with the previous ratio of success. The operation parameter $\beta$ is updated and the calculation of the ratio of success in the corrected state is successively repeated until it is judged in Step 120 that the ratio of success is of the maximum value. Then, the preset values of the operation parameters $\alpha$ and $\beta$ by means of which the ratio of success has reached the maximum value are stored in the backup RAM in the microcomputer as data. The dynamic balance correcting apparatus is subsequently activated continuously while the preset values referred to above are being maintained as they are.

By repeatedly performing the above steps, the ratio of success in the corrected state of dynamic balance of each of a plurality of works W is statistically judged, thereby controlling the position of the work W to be set and the delivery rate of the putty P at all times so that the ratio of success reaches the maximum value. Thus, the unbalance of the work W is repeatedly corrected subsequently under the corrected state of the dynamic balance of each work W, which provides the ratio of success to be at the maximum value, thereby making it possible to correct the unbalance of the work W without the need for experience and skill on the part of an operator and to improve the correction accuracy and the working efficiency of the dynamic balance correcting apparatus.

In the present embodiment, the operation parameter $\alpha$ is first automatically updated for determining the position of the work W set by the work positioning unit 16, thereby setting the ratio of success to the maximum value. Then, the operation parameter $\beta$ is automatically updated for determining the delivery rate of the putty P from the putty delivery unit 18, thereby setting the ratio of success to the maximum value. However, the present invention is not necessarily limited to the present embodiment. It may be constructed in such a manner that the operation parameter $\beta$ (the delivery rate of the putty P) is firstly changed to another value so as to set the ratio of success to the optimum value, and the operation parameter $\alpha$ (the set position of the work W) may then be changed to another value so as to set the ratio of success to the optimum value. Alternatively, only one of the operation parameter $\alpha$ and $\beta$ may be updated.

In the present embodiment as well, the set position of the work W whose dynamic balance is to be corrected and the delivery rate of the putty P are established so as to produce conditions under which the ratio of success in the corrected state is rendered maximum. However, the present invention is not necessarily limited to the present embodiment. As an alternative, the ratio of success to the failure may be calculated from the above data obtained by the balance confirmation unit 24, thereby setting the set position of the work W and the delivery rate of the putty P in such a manner as to raise the probability of success. Further, the amount of residual unbalance of the work W which has had its unbalance corrected may be measured, and either the accumulated value or the average value of the amounts of residual unbalance for a plurality of works W may be calculated. Thereafter, the operation parameters $\alpha$ and $\beta$ may be updated in such a manner that either one of the two values is of either the minimum value or a predetermined value or below. This approach is based on the fact that either the accumulated value or the average value of the amounts of residual unbalance decreases when the ratio of success increases, whereas either the accumulated value or the average value thereof increases when the ratio of success decreases. Since the ratio of success is inversely proportional to either the accumulated value or the average value of the amounts of residual unbalance, the same advantageous effects as described above can be brought about even when the learning is carried out in such a manner that either the accumulated value or the average value of the amounts of residual unbalance becomes the minimum value. In addition, the learning may be stopped when the ratio of success reaches a predetermined value (for example, 98%) or greater.

Furthermore, the present embodiment describes the so-called positive correction type dynamic balance correcting apparatus 10 wherein the state of dynamic-unbalance of the work W is measured, followed by adhesion of the putty P thereto, thereby correcting the unbalance of the work W. However, the present invention is not necessarily limited to the present embodiment. A so-called negative correction type dynamic balance correcting apparatus for correcting the unbalance of the work W by removing unbalanced portions of the work W may also be applied.

Having now fully described the invention, it will be apparent to those skilled in the art that many changes and modifications can be made without departing from the spirit or scope of the invention as set forth herein.

What is claimed is:

1. A method of correcting dynamic balance of a rotatable member, said method comprising the following steps:
    a first step of measuring the position of said rotatable member dynamically unbalanced and the quantity of said rotatable member dynamically unbalanced;
    a second step of deciding the position of said rotatable member to be corrected and the quantity of said rotatable member to be corrected, based on the result of measurement of said unbalanced position and the result of measurement of said unbalanced quantity, respectively;
    a third step of processing a portion corresponding to said correction position of said rotatable member by a quantity corresponding to said correction quantity, thereby correcting the dynamic balance of said rotatable member;
    a fourth step of determining, after the dynamic balance of said rotatable member is corrected, whether or not the dynamic balance of said rotatable member has been brought into a predetermined corrected state; and
    a fifth step of executing learning control for updating at least one of said correction position and said correction quantity, based on the results of said fourth step in such a manner that the yield of a plurality of rotatable members exceeds a predetermined value.

2. A method according to claim 1, wherein, in said third step, correction material in a quantity corresponding to said correction quantity is adhered to said portion corresponding to said correction position so as to correct the dynamic balance of said rotatable member.

3. A method according to claim 1, wherein, in said third step, unbalanced portion of said rotatable member, which has the quantity corresponding to said correction quantity, is removed from said portion corresponding to said correction position so as to correct the dynamic balance of said rotatable member.

4. A method according to claim 1, further including a step between said fourth and fifth steps, for determining whether or not said yield of said plurality of rotatable members exceeds a target value, said fifth step being executed only if said yield is less than said target value in said step.

5. A method according to claim 1, wherein, in said fourth step, amount of residual unbalance of said rotatable member after correction of the dynamic balance of said rotatable member is measured, so as to determine whether or not the amount of residual unbalance is less than or equal to a predetermined value, thereby determining whether or not the dynamic balance of said rotatable members has been brought into a predetermined corrected state.

6. A method according to claim 1, wherein, in said fifth step, the ratio of success in the corrected state of dynamic balance of said plurality of rotatable members is calculated from the results of the determination as to whether or not the dynamic balance of each of said rotatable members has been brought into a predetermined corrected state, and a learning control is performed in such a manner as to cause the ratio of success thus calculated to exceed a predetermined value, thereby enabling the yield of said rotatable members to exceed a predetermined value.

7. A method according to claim 5, wherein, in said fifth step, either the accumulated value or the average value of the measured amounts of residual unbalance of said plurality of rotatable members is calculated, and a learning control is carried out in such a manner as to cause either the accumulated value or the average value thus calculated to be a predetermined value or below, thereby enabling the yield of said rotatable members to exceed the predetermined value.

8. A method according to claim 6, wherein, in said fifth step, respectively overlapped groups of data are selected from the results of the determination as to whether or not the dynamic balance of said plurality of rotatable members has been brought into the predetermined corrected state, thereby sequentially calculating the ratio of success in the corrected state of the dynamic balance of each of said plurality of rotatable members from said respective groups of data.

9. A method of correcting dynamic balance of a rotatable member, said method comprising the following steps A and B:
    said step A including the following repeatedly-executed subdivided steps:
    a first step of measuring the position of said rotatable member dynamically unbalanced and the quantity of said rotatable member dynamically unbalanced;
    a second step of deciding the position of said rotatable member to be corrected and the quantity of said rotatable member to be corrected, based on the result of measurement of said unbalanced position and the result of measurement of said unbalanced quantity, respectively;
    a third step of processing a portion corresponding to said correction position of said rotatable member by a quantity corresponding to said correction quantity, thereby correcting the dynamic balance of said rotatable member; and
    a fourth step of determining, after the dynamic balance of said rotatable member is corrected, whether or not the dynamic balance of said rotatable member has been brought into a predetermined corrected state; and
    said step B including the following step:
    executing learning control for sequentially repeating said first to fourth steps while at least one of said correction position and said correction quantity is being updated when yield of a plurality of rotatable members is reduced, thereby enabling the yield of said plurality of rotatable members to exceed a predetermined value.

10. A method according to claim 9, wherein, in said third step, correction material in a quantity corresponding to said correction quantity is adhered to said portion corresponding to said correction position so as to correct the dynamic balance of said rotatable member.

11. A method according to claim 9, wherein, in said third step, unbalanced portion of said rotatable member, which has the quantity corresponding to said correction quantity, is removed from said portion corresponding to said correction position so as to correct the dynamic balance of said rotatable member.

12. A method according to claim 9, wherein a learning control is executed in step B when said yield is reduced to a value less than a target value.

13. A method according to claim 9, wherein, in said fourth step, amount of residual unbalance of said rotatable member after correction of the dynamic balance of said rotatable member is measured, so as to determine whether or not the amount of residual unbalance is less than or equal to a predetermined value, thereby determining whether or not the dynamic balance of said rotatable members has been brought into a predetermined corrected state.

14. A method according to claim 9, wherein, in said step B, the ratio of success in the corrected state of dynamic balance of said plurality of rotatable members is calculated from the results of the determination as to whether or not the dynamic balance of each of said rotatable members has been brought into a predetermined corrected state, and a learning control is performed in such a manner as to cause the ratio of success thus calculated to exceed a predetermined value, thereby enabling the yield of said rotatable members to exceed a predetermined value.

15. A method according to claim 13, wherein, in said step B, either the accumulated value or the average value of the measured amounts of residual unbalance of said plurality of rotatable members is calculated, and a learning control is carried out in such a manner as to cause either the accumulated value or the average value thus calculated to be a predetermined value or below, thereby enabling the yield of said rotatable members to exceed the predetermined value.

16. A method according to claim 14, wherein, in said step B, respectively overlapped groups of data are selected from the results of the determination as to whether or not the dynamic balance of said plurality of rotatable members has been brought into the predetermined corrected state, thereby sequentially calculating the ratio of success in the corrected state of the dynamic balance of each of said plurality of rotatable members from said respective groups of data.

17. A dynamic balance correcting apparatus for correcting dynamic balance of a rotatable member, said apparatus comprising:
    measuring means for measuring the position of said rotatable member dynamically unbalanced and the quantity of said rotatable member dynamically unbalanced;

deciding means for deciding the position of said rotatable member to be corrected and the quantity of said rotatable member to be corrected, based on the result of measurement of said unbalanced position and the result of measurement of said unbalanced quantity, respectively;

correcting means for processing a portion corresponding to said correction position of said rotatable member by a quantity corresponding to said correction quantity, thereby correcting the dynamic balance of said rotatable member;

determining means for determining, after the dynamic balance of said rotatable member is corrected, whether or not the dynamic balance of said rotatable member has been brought into a predetermined corrected state; and learning means for executing learning control for updating at least one of said correction position and said correction quantity when yield of a plurality of rotatable members is reduced, thereby enabling the yield of said rotatable members to exceed a predetermined value.

18. An apparatus according to claim 17, wherein said correcting means is activated to adhere a correction material in a quantity corresponding to said correction quantity to said portion corresponding to said correction position so as to correct the dynamic balance of said rotatable member.

19. An apparatus according to claim 17, wherein said correcting means is activated to remove unbalanced portion of said rotatable member which has the quantity corresponding to said correction quantity from said portion corresponding to said correction position so as to correct the dynamic balance of said rotatable member.

20. An apparatus according to claim 17, wherein said determining means is activated to measure amount of residual unbalance of said rotatable member after correction of the dynamic balance of said rotatable member so as to make a decision as to whether or not the amount of residual unbalance is less than or equal to a predetermined value, thereby determining whether or not the dynamic balance of said rotatable members has been brought into a predetermined corrected state, and said learning means is activated to calculate either the accumulated value or the average value of the measured amounts of residual unbalance of said plurality of rotatable members and to carry out a learning control in such a manner as to cause either the accumulated value or the average value thus calculated to be a predetermined value or below, thereby enabling the yield of said rotatable members to exceed the predetermined value.

21. An apparatus according to claim 17, wherein said learning means is activated to calculate the ratio of success in the corrected state of dynamic balance of said plurality of rotatable members from the results of the determination as to whether or not the dynamic balance of each of said rotatable members has been brought into a predetermined corrected state and to perform a learning control in such a manner as to cause the ratio of success thus calculated to exceed a predetermined value, thereby enabling the yield of said rotatable members to exceed a predetermined value.

* * * * *

UNITED STATES PATENT AND TRADEMARK OFFICE
CERTIFICATE OF CORRECTION

PATENT NO. : 5,267,140
DATED : 30 November 1993
INVENTOR(S) : Hiromitu IBE It is certified that error appears in the above-identified patent and that said Letters Patent is hereby corrected as shown below:

On the title page, Items:

"[54] METHOD OF APPARATUS FOR CORRECTING DYNAMIC BALANCE OF ROTATABLE MEMBER" should be corrected to read:

--[54] METHOD OF AND APPARATUS FOR CORRECTING DYNAMIC BALANCE OF ROTATABLE MEMBER--.

"[75] Inventor: Horomitu Ibe, Kosai, Japan" should be corrected to read:

--[75] Inventor: Hiromitu Ibe, Kosai, Japan--.

Signed and Sealed this

Fifth Day of July, 1994

*Attest:*

BRUCE LEHMAN

*Attesting Officer*     *Commissioner of Patents and Trademarks*